United States Patent Office 3,094,540
Patented June 18, 1963

3,094,540
NOVEL 6-CHLORO-17α-ETHYNYL-ANDROSTA-
DIENES AND PROCESSES
Ralph F. Hirschmann, Scotch Plains, N.J., assignor to
Merck & Co., Inc., Rahway, N.J., a corporation of New
Jersey
No Drawing. Filed Feb. 13, 1961, Ser. No. 88,659
6 Claims. (Cl. 260—397.4)

This invention is concerned with novel steroid compounds and to processes of preparing the same. More particularly, it releates to novel 6-chloro-[3,2-c]pyrazolo-4,6-androstadiene-17β-ols of the formula:

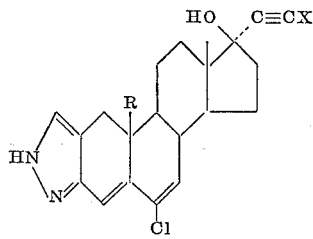

wherein X stands for hydrogen, halogen or the trifluoromethyl group and R is methyl or hydrogen.

The compounds prepared by my invention possess useful therapeutic properties as orally and parenterally active progestational agents and also as estrogenic agents.

In preparing my novel chemical compounds, the starting material utilized is a 6-chloro-17β-hydroxy-4,6-androstadiene-3-one having the formula:

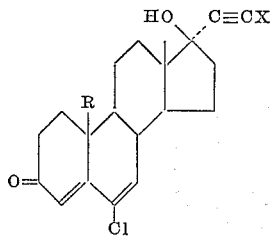

wherein X stands for hydrogen, halogen or the trifluoromethyl group and R represents hydrogen or methyl.

Upon treatment of the above 6-chloro-17β-hydroxy-4,6-androstadiene-3-one with an alkyl formate and sodium hydride in an inert atmosphere there is formed the corresponding 2-hydroxymethylene derivative which has the following structure:

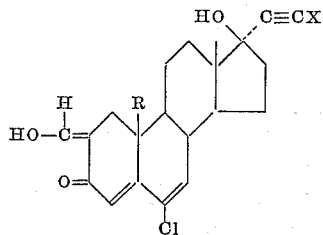

wherein X stands for hydrogen, halogen or the trifluoromethyl group and R represents hydrogen or methyl.

The 6-chloro-17β-hydroxy-2-hydroxymethylene-4,6-androstadiene-3-one is then reacted with hydrazine hydrate in an inert atmosphere to form the [3,2-c]pyrazolo compound having the formula:

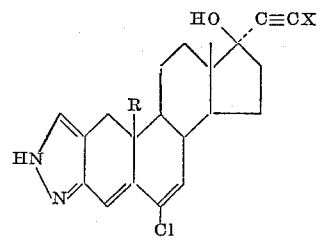

wherein X stands for hydrogen, halogen or the trifluoromethyl group and R represents hydrogen or methyl.

The above designated structure of the [3,2-c]pyrazolo compound is based upon an interpretation of the data according to the state of the art presently known to organic chemists. However, it is to be understood that no part of the specification will be materially defective if it should later be established that the structure of these compounds is isomeric to the structure shown above. The following structure is suggested as a possible isomeric modification:

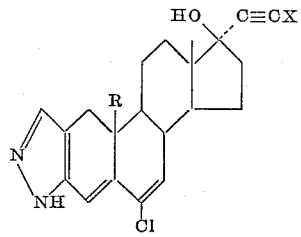

wherein X stands for hydrogen, halogen or the trifluoromethyl group and R represents hydrogen or methyl.

The following examples illustrate methods of carrying out the present invention but it is to be understood that these examples are given for purposes of illustration and not of limitation.

*Example 1*

A suspension of 610 mg. of 6-chloro-17α-ethynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6 - chloro - 17α - ethynyl - 17β-hydroxy-2-hydroxymethylene-19-nor-4,6-androstadiene-3-one, which is taken up in methylene chloride. The solution is filtered and evaporated to dryness.

A 25 mg. aliquot of 6-chloro-17α-ethynyl-17β-hydroxy-2 - hydroxymethylene - 19-nor-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17a-ethynyl-[3,2-c]pyrazolo-19-nor-4,6-androstadiene-17β-ol.

*Example 2*

A suspension of 610 mg. of 6-chloro-17α-ethynyl-17β-hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-ethynyl-17β-hydroxy-2-hydroxymethylene-4,6-androstadiene-3-one, which is taken up in methylene chloride. The solution is filtered and evaporated to dryness.

A 25 mg. aliquot of 6-chloro-17α-ethynyl-17β-hydroxy-2-hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue if flushed two times with n-hexane and dried to give 6-chloro-17α-ethynyl-[3,2-c]pyrazolo-4,6-androstadiene-17β-ol.

*Example 3*

A suspension of 610 mg. of 6-chloro-17α-chloroethynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochoric acid gives 6-chloro-17α-chloroethynyl-17β-hydroxy-2-hydroxymethylene-19-nor-4,6-androstadiene-3-one, which is taken up in methylene chloride. The solution is filtered and evaporated to dryness.

A 25 mg. aliquot of 6-chloro-17α-chloroethynyl-17β-hydroxy-2-hydroxymethylene-19-nor - 4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-chloroethynyl-[3,2-c]pyrazolo-19-nor-4,6-androstadiene-17β-ol.

In accordance with the above procedures, but starting with the 17α-bromoethynyl- or the 17α-fluoroethynyl-6-chloro-17β-hydroxy-19-nor - 4,6-androstadiene-3-one in place of the 17α-chloroethynyl-6-chloro-17β-hydroxy-19-nor-4,6-androstadiene-3-one there is obtained the corresponding 17α-bromoethynyl- or the 17α-fluoroethynyl-6-chloro-[3,2-c]pyrazolo-19-nor-4,6-androstadiene-17β-ol.

The starting materials can be prepared by the following procedures: A solution consisting of 1.7 g. (1.32 cc) of cis-1,2-discholoethylene in 10 cc. of sodium dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium dried ether. The reaction mixture is stirred at room temperature under nitrogen for an additional 1½ hours, followed by the addition over a 15-minute period of 100 mg. of 3-methoxy-2,5(10)-androstadiene-17-one in 4 cc. of sodium dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α - chloroethynyl-3-methoxy - 2,5(10)-androstadiene-17β-ol, M.P. 80–85° C.

I.R. $\lambda_{max}^{Nujol}$ 2.80, 4.48, 6.02, 612μ

In accordance with the above procedure, but using 1,2-dibromoethylene in place of 1,2-dichloroethylene, there is obtained the 17α-bromoethynyl-3-methoxy-2,5(10)-androstadiene-17β-ol.

In accordance with the above procedure, but using 1-chloro-2-fluoroethylene in place of 1,2-dichloroethylene, there is obtained a mixture of the 17α-chloroethynyl- and the 17α - fluoroethynyl - 3 - methoxy - 2,5(10) - androstadiene-17β-ol, which compounds are separated by chromatography.

A solution consisting of 10 mg. of 17α-chloroethynyl-3-methoxy-2,5(10)-androstadiene-17β-ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α-chloroethynyl - 17β - hydroxy - 19 - nor - 4 - androstene-3-one, M.P. 185–190° C.

I.R. $\lambda_{max}^{Nujol}$ 2.95, 4.50, 6.10, 6.21μ

To a solution of 100 mg. of 17α-chloroethynyl-17β-hydroxy-19-nor-4-androstene-3-one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α-chloroethynyl-19-nor-3,5-androstadiene-17β-ol, I.R. $\lambda_{max}^{Neat}$ 2.86, 4.50, 6.05, 6.15μ

A solution consisting of 1 g. of 3-ethoxy-17α-chloroethynyl-19-nor-3,5-androstadiene-17β-ol, 700 mg. of sodium acetate, 5 ml. of water and 40 ml. of acetone is cooled to 0° C. and 1.07 g. of N bromosuccinimide and 0.83 ml. of acetic acid is added. The mixture is stirred for three hours at 0.5° C. and then poured into water to yield the 6β-bromo-17α-chloroethynyl-17β-hydroxy-19-nor-4-androstene-3-one.

Treatment of 6β-bromo-17α-chloroethynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C., followed by dilution with ice water and filtration affords 17α-chloroethynyl-17β-hydroxy-19-nor-4,6-androstadiene-3-one.

A solution consisting of 675 mg. of 17α-chloroethynyl-17β-hydroxy-19-nor-4,6-androstadiene-3-one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo. The crude 5,6-epoxy-17α-chloroethynyl-17β-hydroxy-19-nor-4-androstene-3-one is used directly in the next step.

The 5,6-epoxy-17α-chloroethynyl-17β-hydroxy-19-nor-4-androstene-3-one, dissolved in 20 ml. of 0.4 N hydrochloric acid in chloroform, is allowed to stand for 5.5 hours at room temperature, and then subsequently poured into iced sodium bicarbonate solution. The mixture is extracted with chloroform, dried and concentrated in vacuo. Chromatography on acid-washed alumina (20 g.) and elution with ether-petroleum ether mixtures affords the 6-chloro-17α-chloroethynyl-17β-hydroxy-19-nor-4,6-androstadiene-3-one.

In accordance with the above procedures, but starting with the 17α-bromoethynyl- or the 17α-fluoroethynyl-3-methoxy-2,5(10)-androstadiene-17β-ol in place of the 17α-chloroethynyl-3-methoxy-2,5(10)-androstadiene-17β-ol, there is obtained the corresponding 17α-bromoethynyl- or the 17α-fluoroethynyl-6-chloro-17β-hydroxy-19-nor-4,6-androstadiene-3-one.

*Example 4*

A suspension of 610 mg. of 6-chloro-17α-chloroethynyl-17β-hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-chloroethynyl-17β-hydroxy-2-hydroxymethylene-4,6-androstadiene-3-one, which is taken up in methylene chloride. The solution is filtered and evaporated to dryness.

A 25 mg. aliquot of 6-chloro-17α-chloroethynyl-17β-hydroxy-2-hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-chloroethynyl-[3,2-c]pyrazolo-4,6-androstadiene-17β-ol.

In accordance with the above procedures, but starting with the 17α-bromoethynyl- or the 17α-fluoroethynyl-6-chloro-17β-hydroxy-4,6-androstadiene-3-one in place of the 17α-chloroethynyl-6-chloro-17β-hydroxy-4,6-androstadiene-3-one there is obtained the corresponding 17α-bromoethynyl- or the 17α-fluoroethynyl-6-chloro-[3,2-c]pyrazolo-4,6-androstadiene-17β-ol.

The starting materials can be prepared by the following procedures:

Twenty mg. of p-toluenesulfonyl chloride is added to 400 mg. of 17α-ethynyl-5-androstene-3β,17β-diol in 20 ml. of dihydropyran. The resulting mixture is allowed to stand at room temperature overnight. A 2.5 N NaOH solution is added until the mixture is slightly alkaline. Water is then added and the aqueous phase extracted with 4 portions of ether, each containing approximately 50 ml. The combined ether layers are washed with water, dried over $Na_2SO_4$ and evaporated under reduced pressure to give about 725 mg. of a noncrystalline product. The product dissolved in petroleum ether is chromatographed on 60 g. of neutral alumina and the chromatogram eluted with a 7:3 mixture of petroleum ether and ether to give 400 mg. of crystalline product, the 17α-ethynyl-5-androstene-3β,17β-diol-bis-tetrahydropyranyl ether, I.R. $\lambda_{max}^{Nujol}$ 2.90μ

A solution of about 4 grams of 17α-ethynyl-5-androstene-3β,17β-diol-bis-tetrahydropyranyl ether in 75 ml. of t-butyl alcohol is prepared. About 1.1 equivalents of a 1.0 molar potassium t-butoxide is added and the resulting mixture refluxed for one hour with stirring, and then cooled. About 1.84 ml. of t-butyl hydrochloride is then added in one portion and the reaction mixture is left stirring at room temperature overnight. About 100 ml. of water is added and the resulting aqueous mixture is extracted with four portions of ether, each containing approximately 200 ml. The combined layers are washed with water, dried over sodium sulfate, filtered and evaporated to dryness in vacuo. The residual material is dissolved in petroleum ether and chromatographed on 120 g. of alumina. Elution with petroleum ether gives about 3.10 grams (a 70% yield) of crystals of 17α-chloroethynyl-5-androstene-3β,17β-diol-bis-tetrahydropyranyl ether. The crude product shows infrared peaks at 4.4μ and 2.9μ.

A solution of about 3 g. of the 17α-chloroethynyl-5-androstene-3,17β-diol-bis-tetrahydropyranyl ether in 125 ml. of methanol is prepared. To this solution is added 2.5 ml. of concentrated hydrochloric acid and the reaction mixture is stirred for about 1 hour at room temperature. The methanol is then removed by evaporation under reduced pressure until the product crystallizes. Approximately 100 ml. of water is then added and the resulting product is extracted with four portions of ether, each containing about 200 ml. The combined ether extract is washed with water, dried over sodium sulfate and evaporated to a crystalline residue. The residual crystalline material is rescrystallized several times from ether to give about 1.58 g. of 17-α-chloroethynyl-5-androstene-3β, 17β-diol which has the following properties: M.P. 195° C. *Analysis.*—(Calculated for $C_{21}H_{29}O_2Cl$): C, 72.30; H, 8.38; Cl, 10.16. Found: C, 71.64; H, 8.63; Cl, 10.48.

One hundred mg. of 17α-chloroethynyl-5-androstene-3β,17β-diol is dissolved in 1.0 ml. of cyclohexanone and 10 ml. of benzene in a flask fitted with a magnetic stirrer and a reflux condenser. About 5 ml. of the benzene is distilled and a stream of dry nitrogen is passed through the system and maintained throughout the reaction time. Then 0.5 ml. of a 10% solution of aluminum isopropoxide in benzene is added and the reaction mixture is maintained at reflux temperature for 4 hours. The solution is cooled, 5 drops of water are added and the resultant aluminum hydroxide is filtered off. The filtrate is taken to dryness under reduced pressure. The material is dissolved in ether, filtered, and the filtrate concentrated to give about 37 mg. of crude 17α-chloroethynyl-4-androstene-17β-ol-3-one, M.P. 178–183° C. Recrystallization from ether gives about 25 mg. of the purified product, M.P. 182–184° C. Chromatography of all mother liquors on 3 g. of alumina and elution of the chromatogram with ether gives an additional 20 mg. of product, M.P. 181–184° C. Total yield 45 mg. The product has the following properties:

U.V. $\lambda_{max}^{MeOH}$ 241 mμ, ε 15,000. I.R. $\lambda_{max}^{Nujol}$ 2.8, 4.43, 6.0 6.18μ

Analysis.—(Calculated for $C_{21}H_{27}O_2Cl$): C, 72.73; H, 7.85; Cl, 10.22. Found: C, 73.41; H, 7.93; Cl, 10.81.

To a solution of 482 mg. of 17α-ethynyl-5-androstene-3β,17β-diol-bis-tetrahydropyranyl ether in 10 ml. of tertiarybutyl alcohol, is added about 1.1 equivalents of a 1.0 molar potassium t-butoxide. The resulting mixture is refluxed for one hour, with stirring, and then cooled. 196 mg. of N-bromosuccinimide is then added and the reaction mixture is stirred at room temperature for about 18 hours. The entire reaction mixture is dissolved in water and then extracted with 3 portions of ether, each containing approximately 50 ml. The combined ether extracts are washed with three portions of a saturated solution of $NaHCO_3$, each portion containing approximately 25 ml., then with 3 portions of water, each containing about 25 ml. The ether layer is dried over sodium sulfate, filtered and evaporated to dryness. The oily residue is filtered through 20 g. of aluminum oxide to give 407 mg. of oily material which is dissolved in petroleum ether and chromatographed on 30 g. of acetone activated alkaline alumina. Elution with a 9:1 mixture of petroleum ether and ether yields 87 mg. of 17α-bromoethynyl-5-androstene-3β,17β-diol-bis-tetrahydropyranyl ether. An infrared spectrum of this material shows λmax 4.5μ.

To a solution of 400 mg. of 17α-bromoethynyl-5-androstene-3β,17β-idol-bis-tetrahydropyranyl ether in 40 ml. of methanol is added 0.8 ml. of concetrated HCl, and the reaction mixture is stirred for one hour at room temperature. The methanol is then removed under reduced pressure. Water is added and the resulting solution is extracted with 3 portions of ether, each portion containing approximately 75 ml. The combined ether extracts are washed three times with approximately 50 ml. of water, dried over sodium sulfate, filtered and evaporated to dryness. The residual material is crystallized to give 230 mg. of 17α-bromoethynyl-5-androstene-3β,17β-diol which has the following properties: M.P. 214–215° C.

I.R. $\lambda_{max}^{Nujol}$ 2.7, 2.89, 4.55μ

Analysis.—(Calculated for $C_{21}H_{29}O_2Br$) C, 64.10; H, 7.43; Br. 20.32. Found: C, 62.40; H, 7.65; Br, 20.50.

The 17α-bromoethynyl-5-androstene-3β,17β-diol (195 mg.) is dissolved in 1.95 ml. of cyclohexanone and 20 ml. of benzene, using a flask fitted with a magnetic stirrer and a reflux condenser. After 3 ml. of benzene is distilled, a stream of dry nitrogen is passed through the system, and maintained throughout the entire reaction time. After cooling to room temperature, there is added 0.98 ml. of a 10% solution of aluminum isopropoxide in benzene, and the reaction mixture is refluxed for 3 hours and cooled to room temperature. Ten drops of water are added and the reaction mixture filtered. The filtrate is taken to dryness. The residue is chromatographed on acetone activated acid-washed alumina and eluted with a mixture of seven parts ether to three parts petroleum ether to give 17α-bromoethynyl-4-androstene-17β-ol-3-one, U.V. $\lambda_{max}^{MeOH}$ 240μ, ε 15,700, I.R. $\lambda_{max}^{Nujol}$ 2.9, 4.51, 6.0, 6.2μ

In accordance with the above procedures, but using a fluorinating agent, for example, perchloryl fluoride in place of N-bromosuccinimide, there is obtained the 17α-fluoroethynyl - 5 - androstene - 3β,17β-diol-bis-tetrahydropyranyl ether instead of 17α-bromoethynyl-5-androstene-3β,17β-diol-bis-tetrahydropyranyl ether. The latter compound is then treated with concentrated hydrochloric acid to give 17α-fluoroethynyl-4-androstene-17β-ol-3-one.

*Example 5*

A suspension of 610 mg. of 6-chloro-17α-trifluoropropynyl-17β-hydroxy-19-nor-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-trifluoropropynyl - 17β-hydroxy- 2 -hydroxymethylene-19-nor-4,6-androstadiene-3-one, which is taken up in methylene chloride. The solution is filtered and evaporated to dryness.

A 25 mg. aliquot of 6-chloro-17α-trifluoropropynyl-17β-hydroxy-2-hydroxymethylene - 19 - nor-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-trifluoropropynyl-[3,2-c]pyrazolo-19-nor4,6-androstadiene-17β-ol.

The starting material can be prepared by the following procedures:

A 50 cc. three-neck round bottom flask is fitted with a dry-ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture and the mixture is maintained under reflux for one hour, using a Dry-Ice-acetone condenser. The reaction is then allowed to warm to room temperature, the excess gaseous trifluoropropyne being distilled off. A solution of 500 mg. of 3-methoxy-2,5(10)-androstadiene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 17α-trifluoropropynyl-3-methoxy - 2,5(10)-androstadiene-17β-ol.

To 150 mg. of the above product in 15 cc. of acetone is added 15 mg. of p-toluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-19-nor-4-androstene-3-one, M.P. 128–132° C., I.R. $\lambda_{max}^{Neat}$ 2.95, 4.45, 6.05, 6.20μ. U.V. $\lambda_{max}^{MeOH}$ 238μ, ε% 15,000; $[\alpha]_D^{26 °C}$ —21.0 $CHCl_3$ C, 1.0

To a solution of 100 mg. of 17α-trifluoro-propynyl-17β-hydroxy-19-nor-4-androstene - 3 - one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α-trifluoro-propynyl - 19 - nor-3,5-androstadiene-17β-ol.

A solution consisting of 1 g. of 3-ethoxy-17α-trifluoropropynyl - 19 - nor-3,5-androstadiene-17β-ol, 700 mg. of sodium acetate, 5 ml. of water and 40 ml. of acetone is cooled to 0° C. and 1.07 g. of N-bromosuccinimide and 0.83 ml. of acetic acid is added. The mixture is stirred for 3 hours at 0.5° C. and then poured into water to yield the 6β-bromo - 17α - trifluoropropynyl-17β-hydroxy-19-nor-4-androstene-3-one.

Treatment of 6β-bromo - 17α - trifluoropropynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C. followed by dilution with ice water and filtration affords 17α-trifluoropropynyl - 17β - hydroxy-19-nor-4,6-androstadiene-3-one.

A solution consisting of 675 mg. of 17α-trifluoropropynyl-17β-hydroxy - 19 - nor-4,6-androstadiene-3-one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo.

The crude 5,6-epoxy - 17α - trifluoropropynyl-17β-hydroxy-19-nor-4-androstene-3-one is used directly in the next step.

The 5,6-epoxy-17α-trifluoropropynyl - 17β - hydroxy-19-nor-4-androstene-3-one, dissolved in 20 ml. of 0.4 N hydrochloric acid in chloroform, is allowed to stand for 5.5 hours at room temperature, and then subsequently poured into iced sodium bicarbonate solution. The product is extracted with chloroform, dried and concentrated in vacuo. Chromatography on acid-washed alumina (20 g.) and elution with ether-petroleum ether mixtures affords the 6-chloro-17α-trifluoropropynyl-17β-hydroxy-19-nor-4,6-androstadiene-3-one.

*Example 6*

A suspension of 610 mg. of 6-chloro-17α-trifluoropropynyl - 17β - hydroxy-4,6-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 6-chloro-17α-trifluoropropynyl - 17β - hydroxy-2-hydroxymethylene-4,6-androstadiene-3-one, which is taken up in methylene chloride. The solution is filtered and evaporated to dryness.

A 25 mg. aliquot of 6-chloro-17α-trifluoropropynyl-17β-hydroxy - 2 - hydroxymethylene-4,6-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 6-chloro-17α-trifluoropropynyl-[3,2-c]pyrazolo - 4,6 - androstadiene-17β-ol.

The 17α-trifluoropropynyl - 17β - hydroxy-19-nor-4-androstene-3-one used as starting material can be prepared by the following procedure:

To a solution of one gram of 17β-hydroxy-4-androstene-3-one dissolved in 75 ml. of benzene is added 7.5 ml. of ethylene glycol and 50 g. of p-toluenesulfonic acid. The reaction mixture is heated at reflux with a water separator for 20 hours. The mixture is cooled and about 10 ml. of sodium bicarbonate solution is added. The reaction mixture is then extracted with 3 portions of ether, each portion containing about 100 ml. The combined extracts are washed with water, dried over sodium sulfate and evaporated to dryness to give 3-ethylenedioxy-5-androstene-17β-ol.

A solution of 400 mg. of 3-ethylenedioxy-5-androstene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 3-ethylenedioxy-5-androstene-17-one.

A 50 cc. three-neck round bottom flask is fitted with a Dry-Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture, and the mixture is maintained under reflux for 1 hour, using a Dry-Ice-acetone condenser. The reaction is then allowed to warm to room temperature, the excess gaseous trifluoropropyne being distilled off. A solution of 500 mg. of 3-ethylenedioxy-5-androstene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 3-ethylenedioxy-17α-trifluoropropynyl-5-androstene-17β-ol.

To 150 mg. of the above product in 15 cc. of acetone is added 15 mg. of paratoluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-4-androstene-3-one.

Various changes and modifications may be made in carrying out the present invention without departing from the spirit and scope thereof. Insofar as these changes and modifications are within the purview of the annexed claims, they are to be considered as part of our invention.

We claim:

1. 6 - chloro - 17α - ethynyl - 17β-hydroxy-2-hydroxymethylene-19-nor-4,6-androstadiene-3-one.

2. 6-chloro-17α-ethynyl-17β-hydroxy-2-hydroxymethylene-4,6-androstadiene-3-one.

3. 6-chloro-17α-haloethynyl-17β-hydroxy-2-hydroxymethylene-19-nor-4,6-androstadiene-3-one.

4. 6-chloro-17α-haloethynyl-17β-hydroxy-2-hydroxymethylene-4,6-androstadiene-3-one.

5. 6-chloro-17α-trifluoropropynyl-17β-hydroxy-2-hydroxymethylene-19-nor-4,6-androstadiene-3-one.

6. 6-chloro-17α-trifluoropropynyl-17β-hydroxy-2-hydroxymethylene-4,6-androstadiene-3-one.

References Cited in the file of this patent

UNITED STATES PATENTS 2,945,852    Bergstrom _____ July 19, 1960

OTHER REFERENCES

Ringold et al.: J.A.C.S., 81, 427–431 (1959).